(12) United States Patent
Knudson et al.

(10) Patent No.: US 10,673,794 B2
(45) Date of Patent: Jun. 2, 2020

(54) POPULATING A MESSAGE WITH PERSONAL BOILERPLATE

(71) Applicant: LENOVO (Singapore) PTE. LTD., New Tech Park (SG)

(72) Inventors: Ryan Charles Knudson, Durham, NC (US); Rod D. Waltermann, Rougemont, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 258 days.

(21) Appl. No.: 15/412,965

(22) Filed: Jan. 23, 2017

(65) Prior Publication Data
US 2018/0212908 A1    Jul. 26, 2018

(51) Int. Cl.
| | | |
|---|---|---|
| *H04L 12/58* | (2006.01) | |
| *G06F 40/174* | (2020.01) | |
| *G06F 40/186* | (2020.01) | |
| *G06F 40/274* | (2020.01) | |
| *G06F 40/279* | (2020.01) | |
| *G06F 40/30* | (2020.01) | |
| *H04L 29/12* | (2006.01) | |
| *G06Q 10/10* | (2012.01) | |

(Continued)

(52) U.S. Cl.
CPC .......... *H04L 51/08* (2013.01); *G06F 40/174* (2020.01); *G06F 40/186* (2020.01); *G06F 40/20* (2020.01); *G06F 40/274* (2020.01); *G06F 40/279* (2020.01); *G06F 40/295* (2020.01); *G06F 40/30* (2020.01); *G06Q 10/107* (2013.01); *H04L 51/04* (2013.01); *H04L 51/063* (2013.01); *H04L 51/16* (2013.01); *H04L 61/30* (2013.01)

(58) Field of Classification Search
CPC ............. H04L 51/00–046; H04L 51/22; H04L 51/063; H04L 51/08; H04L 51/16; H04L 51/32; H04L 61/157; H04L 61/1594; H04L 61/30; H04L 61/301; G06Q 10/10–103; G06Q 10/107; G06F 40/20–30
See application file for complete search history.

(56) References Cited

U.S. PATENT DOCUMENTS

| | | | |
|---|---|---|---|
| 7,475,109 B1* | 1/2009 | Fletcher | G06Q 10/107 709/204 |
| 8,706,827 B1* | 4/2014 | Noble | G10L 13/027 709/206 |
| 9,477,371 B2* | 10/2016 | Buford | G06F 3/0481 |

(Continued)

FOREIGN PATENT DOCUMENTS

| | | | | |
|---|---|---|---|---|
| WO | WO-2014114172 A1 * | 7/2014 | | H04L 51/28 |

*Primary Examiner* — Brendan Y Higa
(74) *Attorney, Agent, or Firm* — Kunzler Bean & Adamson

(57) ABSTRACT

For an electronic communication environment, an apparatus for populating an electronic message with personal boilerplate is disclosed. The apparatus may include a processor and a memory that stores code executable by the processor to identify a message recipient for a message being composed at the apparatus. The processor identifies a communication history between the message recipient and a message composer and further identifies a boilerplate history of the message composer. The processor populates the message being composed with personal boilerplate selected based on the communication history and the boilerplate history. A method and computer program product also perform the functions of the apparatus.

20 Claims, 6 Drawing Sheets

(51) Int. Cl.
    *G06F 40/295*    (2020.01)
    *G06F 40/20*     (2020.01)

(56) References Cited

U.S. PATENT DOCUMENTS

| | | | | |
|---|---|---|---|---|
| 2006/0101127 | A1* | 5/2006 | Brown | G09B 5/06 |
| | | | | 709/207 |
| 2008/0263158 | A1* | 10/2008 | del Cacho | G06Q 10/107 |
| | | | | 709/206 |
| 2009/0030933 | A1* | 1/2009 | Brezina | H04M 15/00 |
| 2010/0273443 | A1* | 10/2010 | Forutanpour | H04L 51/02 |
| | | | | 455/404.1 |
| 2013/0124643 | A1* | 5/2013 | DeLuca | H04L 51/16 |
| | | | | 709/206 |
| 2014/0155039 | A1* | 6/2014 | Kim | H04W 4/12 |
| | | | | 455/412.1 |
| 2014/0189027 | A1* | 7/2014 | Zhang | H04L 51/02 |
| | | | | 709/206 |
| 2014/0244616 | A1* | 8/2014 | Kuramura | G06Q 10/063114 |
| | | | | 707/722 |
| 2014/0244630 | A1* | 8/2014 | Kuramura | G06F 16/24578 |
| | | | | 707/723 |
| 2015/0188861 | A1* | 7/2015 | Esplin | H04L 51/06 |
| | | | | 709/206 |
| 2015/0222586 | A1* | 8/2015 | Ebersman | G06F 17/276 |
| | | | | 715/752 |
| 2016/0070722 | A1* | 3/2016 | Heyward | G06F 16/58 |
| | | | | 707/772 |
| 2016/0087925 | A1* | 3/2016 | Kalavagattu | H04L 51/066 |
| | | | | 709/206 |
| 2016/0357718 | A1* | 12/2016 | Gelfand | G06F 17/2264 |
| 2018/0316635 | A1* | 11/2018 | Chiu | H04L 51/046 |

* cited by examiner

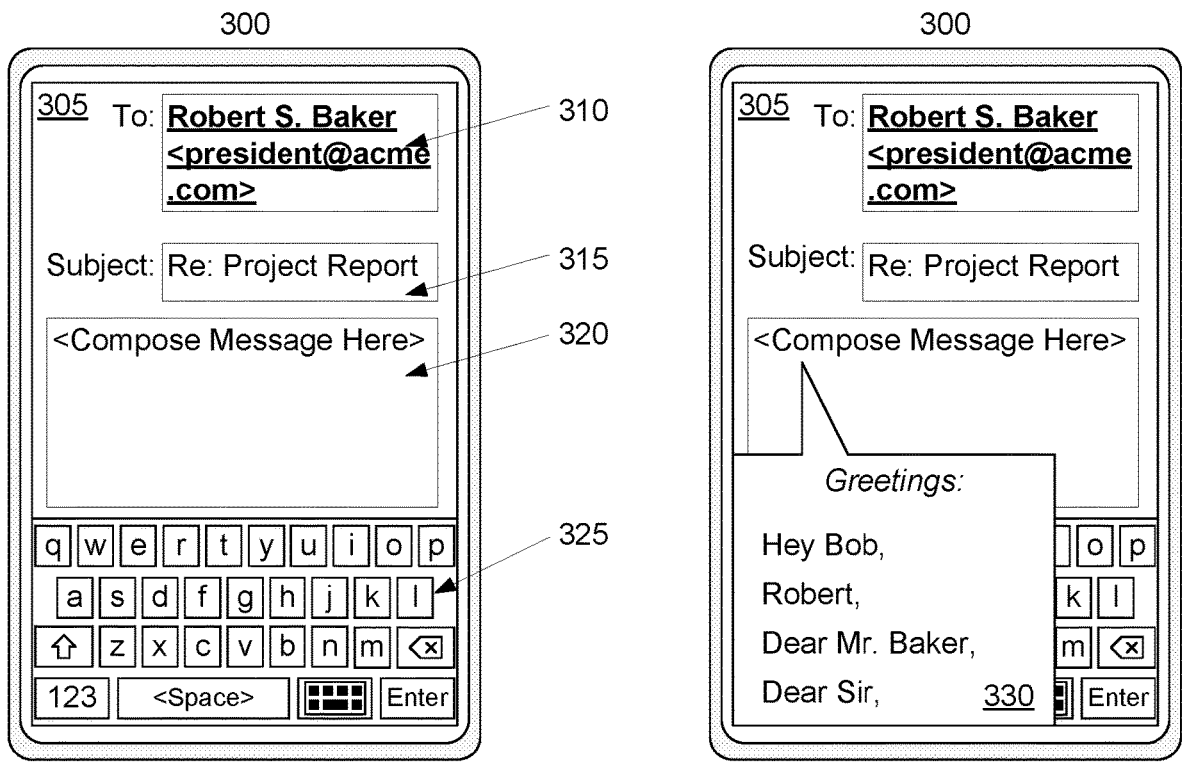
FIG. 3A
FIG. 3B
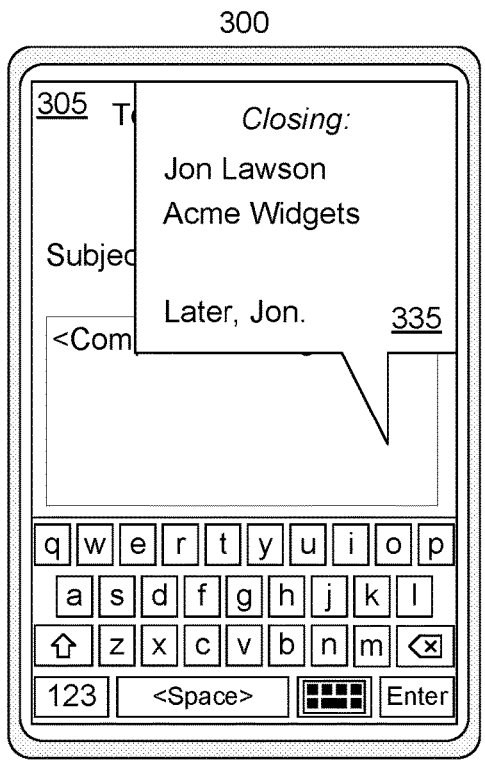
FIG. 3C

POPULATING A MESSAGE WITH PERSONAL BOILERPLATE

BACKGROUND

Field

The subject matter disclosed herein relates to electronic communications and more particularly relates to automatically populating an electronic message with personal boilerplate.

Description of the Related Art

Electronic communications, such as electronic mail, chat rooms, text messaging, and the like, facilitate easy communication. Many electronic messages include greetings, closings, signatures, and other content in common with other electronic messages composed by the same user.

BRIEF SUMMARY

An apparatus for populating an electronic message with personal boilerplate is disclosed. A method and computer program product also perform the functions of the apparatus.

The apparatus may include a processor and a memory that stores code executable by the processor. The processor identifies a message recipient for a message being composed at the apparatus. The processor identifies a communication history between the message recipient and a message composer and further identifies a boilerplate history of the message composer. The processor automatically populates the message being composed with personal boilerplate selected based on the communication history and the boilerplate history.

In some embodiments, the personal boilerplate includes one or more of a salutation, a valediction, a signature, a message body, and a subject line. In certain embodiments, the processor further identifies a date and time of day. In such embodiments, the personal boilerplate is further selected based on the date and time of day.

In some embodiments, identifying the message recipient includes determining whether a recipient address is a professional address or a personal address. In such embodiments, the processor selects different personal boilerplate for the professional address than for the personal address. In one embodiment, the processor further identifies a preferred name of the message recipient based on the communication history. Here, the personal boilerplate includes the preferred name.

In some embodiments, the processor further identifies a relationship type between the message recipient and the message composer. The identified relationship type may be a familial relationship, a commercial relationship, a friendship, an acquaintance, a workplace associate, a new contact, a membership in a common group, or the like. Here, the personal boilerplate is further selected based on the relationship type. In further embodiments, the processor further identifies a strength of relationship based on the communication history. In such embodiments, the personal boilerplate is further selected based on the strength of relationship. In certain embodiments, the processor further selects one of a signature and a subject line based on the communication history and the salutation history.

A method for populating an electronic message with personal boilerplate includes identifying a message recipient for a message being composed at a messaging device. The method also includes identifying a communication history between the message recipient and a message composer. The method includes identifying a boilerplate history of the message composer. The method further includes populating, by use of a processor, the message being composed with a personal boilerplate selected based on the communication history and the boilerplate history.

In certain embodiments, the method includes identifying a date and time of day. In such embodiments, the personal boilerplate is further selected based on the date and time of day. In some embodiments, identifying the message recipient includes determining whether a recipient address is a professional address or a personal address. Here, the different personal boilerplate is selected for the professional address than for the personal address.

In some embodiments, the method includes identifying a preferred name of the message recipient based on the communication history and a message address of the message recipient. In such embodiments, the personal boilerplate includes the preferred name.

In some embodiments, the method includes identifying a relationship type between the message recipient and the message composer. The relationship type may be one of: a familial relationship, a commercial relationship, a friendship, an acquaintance, a workplace associate, a new contact, and a membership in a common group. In such embodiments, the personal boilerplate is further selected based on the relationship type.

In one embodiment, the method includes identifying a strength of relationship based on the communication history. In such embodiments, the personal boilerplate is further selected based on the strength of relationship. In another embodiment, the method includes performing a sentiment analysis. In such embodiments, the personal boilerplate is further selected based on the sentiment analysis.

In certain embodiments, the method includes identifying a message content type from content of the message being composed. In such embodiments, the personal boilerplate is further selected based on the message content type. In some embodiments, the personal boilerplate includes one or more of a salutation, a valediction, a signature, a method body, and a subject line.

A program product for populating an electronic message with personal boilerplate includes a computer readable storage medium that stores code executable by a processor. Here, the executable code includes code to perform: identifying a message recipient for a message being composed at a messaging device, identifying a communication history between the message recipient and a message composer, identifying a salutation history of the message composer, and populating the message being composed with a salutation selected based on the communication history and the salutation history.

In some embodiments, identifying the communication history includes determining whether the message recipient is a new contact or an existing contact. Here, a different salutation is selected for a new contact than for an existing contact. In certain embodiments, the program product further includes code to perform a sentiment analysis on the message being composed and code to populate the message being composed with a one of a subject line and a valediction selected based on an identified message sentiment.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3A is a diagram illustrating a first example of a messaging device populating an electronic message with personal boilerplate;

FIG. 3B is a diagram illustrating another embodiment of the messaging device of FIG. 3A;

FIG. 3C is a diagram illustrating a further embodiment of the messaging device of FIG. 3A;

DETAILED DESCRIPTION

Figure 1:
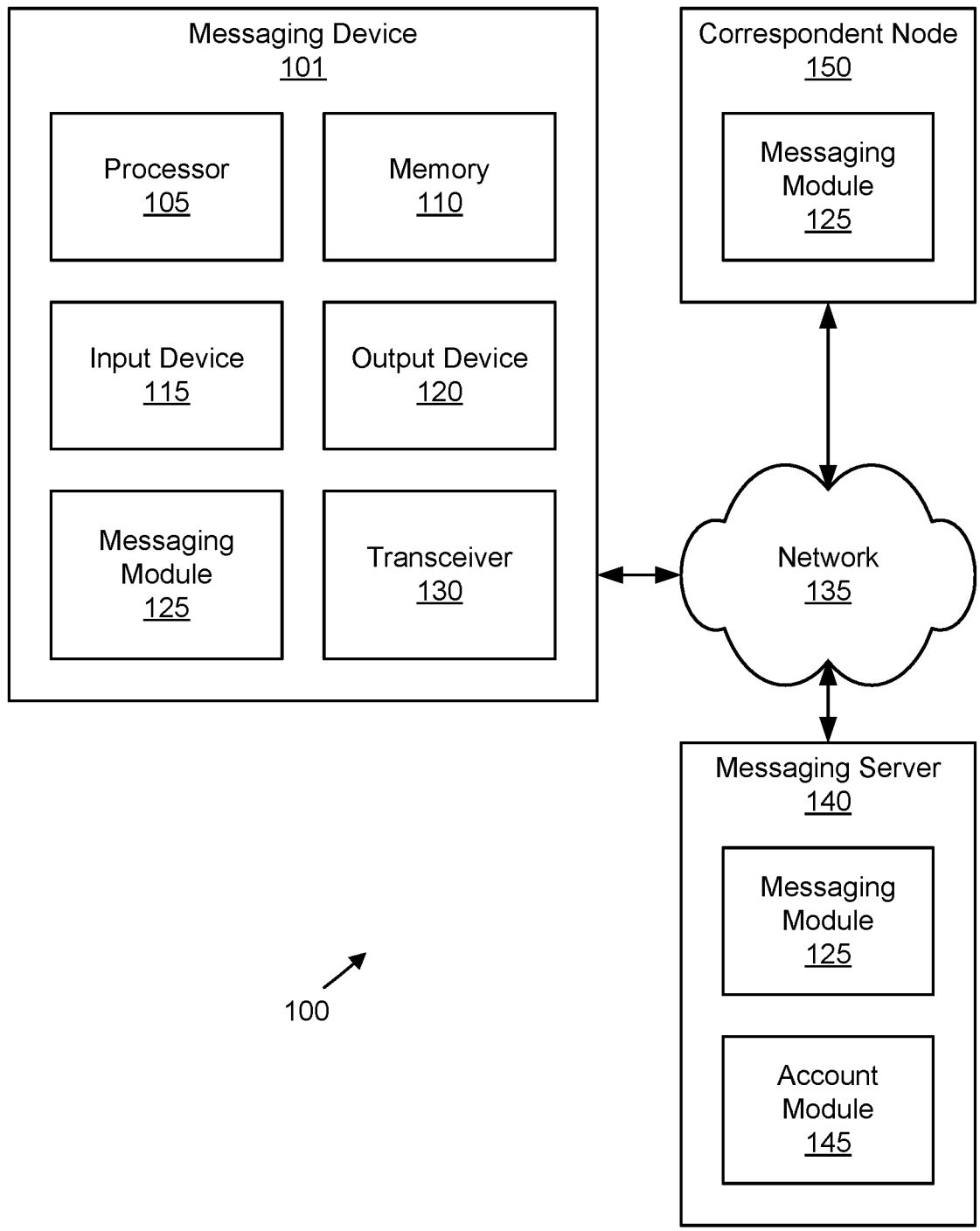
FIG. 1 is a schematic block diagram illustrating one embodiment of a system for populating an electronic message with personal boilerplate.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object-oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks. As used herein, a "computer" refers to any computing device capable of executing program code.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products allow users to more easily tailor their communications by auto-populating greetings, salutations, valedictions, signatures, and other personal "boilerplate," thereby allowing users to spend less time drafting communications. As used herein 'communications' refer to any and all types of electronic messages, to include text messaging, email, instant messaging, and the like. Auto-populating personal boilerplate into an electronic message is especially useful when drafting communications to frequent contacts, i.e., contacts with a strong communicative history with the user.

In some embodiments, an external source may be consulted to identify a preferred name for a new contact. Auto-populating personal boilerplate may include suggesting a greeting for a first time contact that include the contact's preferred name.

For example, when a user sends a communication to someone else, they will most likely add a greeting (e.g., salutation) and a closing (e.g., valediction). The methods and devices described herein leverage predictive methods employing analyses of many factors—time of day communication is authored, a date and/or day of the week the communication is authored, communicative history between user and recipient, strength of connection between user and recipient, affiliation between user and recipient (familial, commercial, etc.), usage history of personal boilerplate (e.g., salutations, valedictions, subject lines, signatures, and even message bodies), relation to types of email addresses of recipients (for example, 'customercare@acmewidget.org' vs. 'president@acmewidget.org'), and the like. In certain embodiments, information may be gathered from the message recipient to see how they typically sign their emails, to offer suggested greetings based upon the recipient's personal preferences. Additionally, sentiment and thematic analysis can be applied to the message body to help determine if the conversation is at a personal or professional level.

FIG. 1 depicts a system 100 for populating an electronic message with personal boilerplate, according to embodiments of the disclosure. The system 100 includes a messaging device 101 in communication with a messaging server 140 via a data network 135. In certain embodiments, the system 100 may also include one or more correspondent nodes 160.

The messaging device 101 comprises a processor 105, a memory 110, an input device 115, an output device 120, a messaging module 125, and a transceiver 130. In some embodiments, the messaging device 101 includes a body or an enclosure, wherein the components of the messaging device 101 are contained within the enclosure. In some embodiments, the messaging device 101 includes a power source, for example a battery or a power adapter, which provides electrical power to components of the messaging device 101. In certain embodiments, the components of the messaging device 101 are communicatively coupled to each other, for example via a computer bus.

The processor 105, in one embodiment, may comprise any known controller capable of executing computer-readable instructions and/or capable of performing logical operations. For example, the processor 105 may be a microcontroller, a microprocessor, a central processing unit (CPU), a graphics processing unit (GPU), an auxiliary processing unit, a FPGA, or similar programmable controller. In some embodiments, the processor 105 executes instructions stored in the memory 110 to perform the methods and routines described herein. The processor 105 is communicatively coupled to the memory 110, the input device 115, the output device 120, the messaging module 125, and the transceiver 130. In certain embodiments, the processor 105 may perform the methods described herein.

The memory 110, in one embodiment, is a computer readable storage medium. In some embodiments, the memory 110 includes volatile computer storage media. For example, the memory 110 may include a random-access memory (RAM), including dynamic RAM (DRAM), synchronous dynamic RAM (SDRAM), and/or static RAM (SRAM). In some embodiments, the memory 110 includes non-volatile computer storage media. For example, the memory 110 may include a hard disk drive, a flash memory, or any other suitable non-volatile computer storage device. In some embodiments, the memory 110 includes both volatile and non-volatile computer storage media.

In some embodiments, the memory 110 stores data relating to populating an electronic message with personal boilerplate. For example, the memory 110 may store messages, groups, addresses, personal boilerplate, communication history, boilerplate history, and the like. In some embodiments, the memory 110 also stores program code and related data, such as an operating system operating on the messaging device 101.

The input device 115, in one embodiment, may comprise any known computer input device including a touch panel, a button, a keyboard, or the like. For example, the input device 115 may include a handwriting input unit operatively coupled to the processor 105. In some embodiments, the input device 115 may be integrated with the output device 120, for example, as a touchscreen or similar touch-sensitive display. In some embodiments, the input device 115 comprises a touchscreen such that text may be input by using a virtual keyboard displayed on the touchscreen and/or by handwriting on the touchscreen. In some embodiments, the input device 115 comprises two or more different devices, such as a keyboard and a touch panel. The input device 115 may include a microphone used to input sound or voice data (e.g., voice commands) and/or a camera for capturing images or otherwise inputting visual data.

The output device 120, in one embodiment, is configured to output visual, audible, and/or haptic signals. In some embodiments, the output device 120 includes an electronic display capable of outputting visual data to a user. For example, the output device 120 may include an LCD display, an LED display, an OLED display, a projector, or similar display device capable of outputting images, text, or the like to a user. In certain embodiments, the output device 120 includes one or more speakers for producing sound, such as an audible alert or notification. In some embodiments, the output device 120 includes one or more haptic devices for producing vibrations, motion, or other haptic feedback.

In some embodiments, all or portions of the output device 120 may be integrated with the input device 115. For example, the input device 115 and output device 120 may form a touchscreen or similar touch-sensitive display. As another example, the input device 115 and output device 120 may form a display that includes haptic response mechanisms. In other embodiments, the output device 120 may be located near the input device 115. The output device 120 may receive instructions and/or data for output from the processor 105 and/or the messaging module 125.

The messaging module 125, in one embodiment, is configured to identify a message recipient for a message being composed at the messaging device 101, identify a communication history between the message recipient and a message composer, identify a boilerplate history of the message composer, and populate the message being composed with personal boilerplate (e.g., a salutation, a valediction, a subject line, a signature, a message body) selected based on the communication history and the boilerplate history. The messaging module 125 may also evaluate additional factors when selecting the personal boilerplate, such as a date and time of day, whether a recipient address is a professional address or a personal address, a relationship type, a strength of relationship, and content of the message being composed. Further, the messaging module 125 may identify a preferred name of the message recipient and incorporate the preferred name into the personal boilerplate.

For example, if the user is friends with his/her boss, then email communication between the two may be either personal or professional. If the user typically sends professional emails during business hours (e.g., from 8 AM to 5 PM), then the messaging module 125 may pre-populate a greeting with the person's name "Robert," and a more professional closing of "Jon Lawson, Acme Widgets" (where Jon Lawson is the user). Alternatively, if Jon sends an email at 5:30 (e.g., after business hours), the messaging module 125 may offer up the less formal greeting of "Hey Bob" and the informal closing of "Later, Jon". Further, the messaging module 125 may more accurately auto-populate the message by leveraging sentiment and thematic analysis, such that even if the email was sent after business hours, but contained work related content, then the messaging module 125 will change the informal (personal) greeting and salutation to the professional one.

In some scenarios, a user sends an email (or another electronic message) to someone they have not communicated with very much, or never before. The messaging module 125 may communicate with the messaging server 140 to identify how the message recipient typically signs their communication in a professional or personal manner, along with the sender's history of greetings and salutations with new contacts. Using this knowledge, the messaging module 125 auto-populates or suggest greetings using a preferred name of the message recipient, the greetings and preferred name selected based on the type of communication (e.g., personal or professional). Additionally, other personal boilerplate the messaging module 125 may populate or suggest other items of personal boilerplate (e.g., signature, message body) selected from the sender's history of greetings and salutations with new contacts.

For example, the user may want to send an email to "charles.k.george@acme.com." Because the messaging module 125 can identify how Charles K. George signs his email for professional and personal communication, it can offer a suggestion based on the message context. If the user wants to invite Charles K. George to a party, the messaging module 125 may suggest the greeting of "Hi, Kilroy" because Charles K. George does not like his first name and signs his personal emails as "Kilroy." But on the other hand, if the communication was in regards to a property sale, then the messaging module 125 may suggest "Dear Mr. George," as Charles K. George typically he signs professional communications with C. K. George.

The messaging module 125 may be comprised of computer hardware, computer software, or a combination of both computer hardware and computer software. The messaging module 125 is discussed in further detail with reference to FIG. 2, below.

The transceiver 130, in one embodiment, is configured to send and to receive electronic communications via the data network 135. In certain embodiments, the transceiver 130 is a wireless transceiver capable of exchanging information via electromagnetic radiation (e.g., communication via radio frequencies, infrared, visible light, and the like) or sound (e.g., ultrasonic communication). In certain embodiments, the processor 105 is a wired transceiver capable of exchanging information via a transmission line (e.g., wire, data cable, or optical fiber). In some embodiments, the transceiver 130 receives messages from the messaging server 140. In other embodiments, the transceiver 130 receives messages from one or more of the correspondent nodes 150.

The data network 135, in one embodiment, is a telecommunications network configured to allow the messaging device 101, the messaging server 140, and/or any correspondent node 150 to pass data to each other. The data network 135 may be comprised of wired data links, wireless data links, and/or a combination of wired and wireless data links. Examples of wireless data networks include, but are not limited to, a wireless cellular network, a local wireless network, such as a Wi-Fi network, a Bluetooth® network, a near-field communication (NFC) network, an ad hoc network, and/or the like. The data network 135 may include a wide area network (WAN), a storage area network (SAN), a local area network (LAN), an optical fiber network, the internet, or other digital communication network. In some embodiments, the data network 135 may include two or more networks. The data network 135 may include one or more servers, routers, switches, and/or other networking equipment. The data network 135 may also include computer readable storage media, such as a hard disk drive, an optical drive, non-volatile memory, random access memory (RAM), or the like.

The messaging server 140, in one embodiment, is a server configured to support one or more messaging services. In some embodiments, the messaging server 140 may provide an internet-based messaging service. For example, the messaging device 101 and/or the correspondent nodes 150 may access the messaging service using a web browser or the like. Examples of messaging services that may be supported by the messaging server 140 include, but are not limited to, email, short messaging service (SMS), text messaging, multimedia messaging service (MMS), instant messaging, and the like.

In some embodiments, the messaging server 140 is configured to identify a message recipient for a message being composed at the messaging device 101, identify a communication history between the message recipient and a message composer, identify a boilerplate history of the message composer, and populate the message being composed with personal boilerplate (e.g., a salutation, a valediction, a subject line, a signature, a message body) selected based on the communication history and the boilerplate history. As depicted, the messaging server 140 may include one instance of a messaging module 125. In certain embodiments, the message module 125 implemented on the messaging server 140 provides messaging services to a client device, such as the messaging device 101 and/or a correspondent node 150.

Each correspondent nodes 150, in one embodiment, is configured to send and receive messages via the data network 135. For example, a correspondent node 150 may send a message to the messaging device 101, and/or to another correspondent node 150, via the messaging server 140. In some embodiments, each correspondent node 150 is a messaging device comprising a processor, a memory, and a transceiver, similar to the messaging device 101. As depicted, the correspondent node 150 may include one instance of a messaging module 125. The correspondent nodes 150 may access the data network 135 via wired or wireless data links. While only one correspondent node 150 is depicted in FIG. 1, in other embodiments, any number of correspondent nodes 150 may be included in the system 100.

Figure 2:
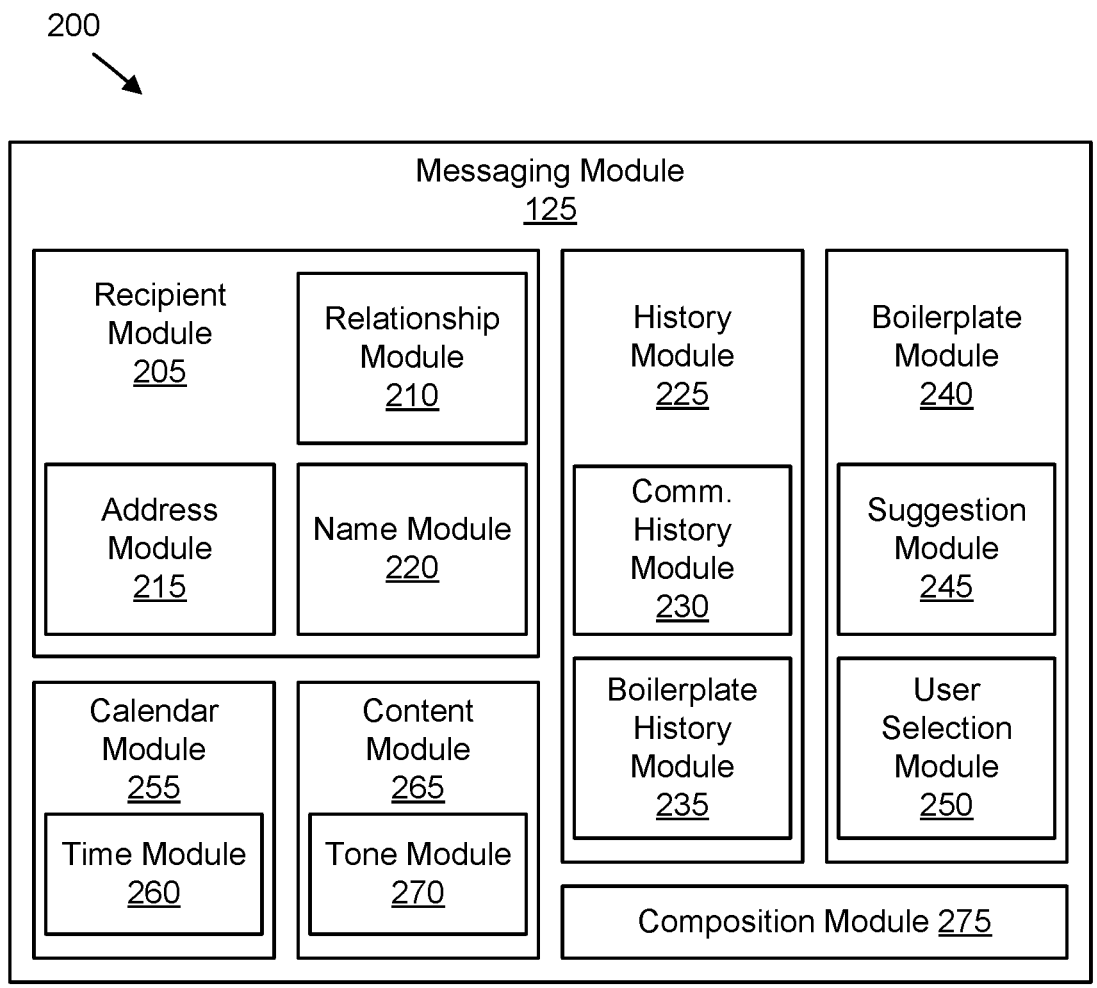
FIG. 2 is a schematic block diagram illustrating one embodiment of an apparatus for populating an electronic message with personal boilerplate.

FIG. 2 depicts a messaging apparatus 200 for populating an electronic message with personal boilerplate, according to embodiments of the disclosure. In some embodiments, the messaging apparatus 200 may include an embodiment of the messaging module 125 described above with reference to FIG. 1. In some embodiments, the messaging apparatus 200 may be part of a messaging device, such as the messaging device 101 or correspondent node 150. In other embodiments, the messaging apparatus 200 may be part of a messaging server, such as the messaging server 140 or a webmail server.

In general, as described above, the messaging apparatus 200 identify a message recipient for a message being composed, identify a communication history between the message recipient and a message composer, identify a boilerplate history of the message composer, and populate the message being composed with personal boilerplate selected based on the communication history and the boilerplate history. In some embodiments, the messaging apparatus 200 may also evaluate additional factors when selecting the personal boilerplate, such as a date and time of day, whether a recipient address is a professional address or a personal address, a relationship type, a strength of relationship, and content of the message being composed. Further, the messaging apparatus 200 may identify a preferred name of the message recipient and incorporate the preferred name into the personal boilerplate.

The messaging apparatus 200, in one embodiment, includes a recipient module 205, a history module 225, and a boilerplate module 240. In some embodiments, the messaging apparatus 200 also includes one or more of a relationship module 210, an address module 215, a name module 220, a communication history module 230, a boilerplate history module 235, a suggestion module 245, a user selection module 250, a calendar module 255, a time module 260, a content module 265, a tone module 270, and a composition module 275. The modules of the messaging apparatus 200 may be communicatively coupled to one another.

The recipient module 205, in one embodiment, is configured to identify the message recipient of a message being composed. In some embodiments, the recipient module 205 parses one or more fields of a composition interface to identify the message recipient. For example, the composition interface may include a "to:" field or address field, wherein contacts, addresses (e.g., email addresses), phone numbers, usernames, and the like may be input. In one embodiment, the recipient module 205 determines whether the message is addressed to a personal address or a professional address of the message recipient. In certain embodiments, the recipient module 205 identifies the message recipient by accessing contact information and/or user profiles corresponding to each message recipient.

In some embodiments, the message being composed may be addressed to a plurality of recipients. For example, the message may be addressed to a group address or a group alias. As another example, the "to:" field may include multiple entries. In such embodiments, the recipient module 205 may determine the identities of the plurality of recipients. Because different personal boilerplate may be used when addressing an individual then when addressing multiple persons, the recipient module 205 may indicate to the boilerplate module 240 whether the messages addressed to an individual or to a group.

In some embodiments, the recipient module 205 obtains information provided by the message recipient indicating how the recipient typically signs his/her messages, a preferred name of the recipient, and other personal preferences of the recipient. The boilerplate module 240 may use the recipient's personal preferences when selecting the personal boilerplate and auto-populating the message.

In one embodiment, the recipient module 205 contains circuitry for identifying the message recipient of the message being composed. In another embodiment, the recipient module 205 is implemented using program code executed on the processor 105. As depicted, the recipient module 205 may include one or more subcomponents such as the relationship module 210, the address module 215, and/or the name module 220.

The relationship module 210, in one embodiment, is configured to identify relationship information for the message recipient. Examples of relationship information include, but are not limited to, a relationship type, a relationship strength, a relationship length, a type of contact, and the like. In one embodiment, the relationship module 210 accesses contact information for the message recipient to identify relationship information. In another embodiment, the relationship module 210 examines communication history between the message recipient and the message composer to identify the relationship information. In yet another embodiment, the relationship module 210 may query a server, such as a social networking server, to identify the relationship information.

Different personal boilerplate may be associated with different relationship types, therefore the relationship module 210 may communicate and identified relationship type to the boilerplate module 240. Examples of relationship types include, but are not limited to, a familial relationship, a commercial relationship, a friendship, an acquaintance, a workplace associate, a new contact, and a membership in a common group, organization, or community, and the like. Where membership in a common group is identified, the relationship module 210 may further identify the type of group. For example, communication with a friend in a fantasy sports league may be more aggressive and jovial than communication with another friend in a religious study group.

Additionally, different personal boilerplate be used depending on the relationship strength. For example, certain valedictions may be used with close friends that would not be used with social network friends. As another example, certain salutations may be used with longtime friends that would not be used with new friends. The strength of relationship may be indicated by a length of relationship, a frequency of communication between the message recipient and the message composer, a tone used in communications between the message recipient and the message composer, and the like.

In one embodiment, the relationship module 210 contains circuitry for identifying the message recipient of the message being composed. In another embodiment, the relationship module 210 is implemented using program code executed on the processor 105. While depicted as a component of the recipient module 205, in certain embodiments the relationship module 210 may be a separate module within the messaging module 125.

The address module 215, in one embodiment, is configured to identify an address to which the message being composed is addressed and to distinguish between various addresses used by the message recipient. For example, a contact entry may include a phone number (e.g., an address for SMS/MMS messages), a personal email account, a professional email account, an IM handle or username, and the like. Different personal boilerplate may be associated with the various addresses used by the message recipient, therefore the address module 215 identifies an address to which messages is addressed.

The address module 215 may also identify a messaging platform associated with the message being composed. For example, the address module 215 may distinguish between an email client, an SMS/MMS chat application, a social network messaging application, and the like. In one embodiment, the address module 215 contains circuitry for identifying an address to which messages being composed and/or a messaging platform used to compose the message. In another embodiment, the address module 215 is implemented using program code executed on the processor 105. While depicted as a component of the recipient module 205, in certain embodiments the address module 215 may be a separate module within the messaging module 125.

The name module 220, in one embodiment, is configured to identify a preferred name of the message recipient and/or message composer. The preferred name may be context dependent. For example, an individual may prefer being addressed by his or her first name in an informal context, such as a conversation between friends or family members, while being addressed by his or her title and last name in a professional context. As another example, an individual may use one name (e.g., a middle name) when communicating using a personal email account and a different name (e.g., a full name) when communicating using a business email account.

Still further, the preferred name may depend on group membership. For example, the message composer may refer to the message recipient using a nickname or surname when they belong to a fantasy sports league, but a given name when the belong to a study group. Additionally, the preferred name may depend on the messaging platform. For example, the user may use a username, nickname, or pseudonym when communicating on Internet forums or message boards, but use a given name when communicating via SMS/MMS messaging.

In one embodiment, the name module 220 may operate on communication history between the message composer and the message recipient in order to identify the preferred name. Such communication history may be gathered by the history module 225 and/or communication history module 230, as discussed in further detail below. In another embodiment, the name module 220 may receive the preferred name from a user profile and/or a social network account of the message. For example, the name module 220 may query the messaging server 140 for the preferred name.

Additionally, the name module 220 may determine rules governing the use of various preferred names of the message recipient. For example, of the message composer's friends with his or her boss, email communication to the boss may be either professional or personal. If the message composer typically sends professional emails during business hours, then the name module 220 would identify "Robert" to be the preferred name when addressing the boss during business hours. However, the name module 220 may also determine "Bob" to be the preferred name when I am dressing the boss outside of business hours. Similarly, the name module 220 may identify a different preferred name to use when inviting the message recipient to a party then when negotiating a transaction with the message recipient.

In one embodiment, the name module 220 contains circuitry for identifying preferred name and/or rules governing use of various preferred names of the message recipient. In another embodiment, the name module 220 is implemented using program code executed on the processor 105. While depicted as a component of the recipient module 205, in certain embodiments the name module 220 may be a separate module within the messaging module 125.

The history module 225, in one embodiment, is configured to identify a communication history between the message recipient and a message composer and a boilerplate history of the message composer. As depicted, the history module 225 may include a communication history module 230 and a boilerplate history module 235 for identifying communication history in the boilerplate history. In some embodiments, the history module 225 accesses one or more databases to identify the communication history and/or the boilerplate history. In certain embodiments, the history module 225 may maintain one or more databases containing communication history and/or boilerplate history.

In some embodiments, the history module 225 analyzes the communication history and the boilerplate history to associate certain personal boilerplate with certain message recipients, events, dates, and the like. From this analysis, the history module 225 may establish rules for when specific items of personal boilerplate are to be used based on the communication history and the boilerplate history. The history module 225 may further analyze the communication history and the boilerplate history to notify user preferences. For example, certain users may disdain certain phrases. As another example, user may prefer to use a full signature in an initial message of a conversation and an abbreviated or shortened signature in subsequent messages of the same conversation. The history module 225 may store these user preferences. The history module 225 may include hardware circuitry and/or program code to be executed on the processor 105.

The communication history module 230, in one embodiment, is configured to identify the communication history between the message recipient. As used herein, communication history refers to both message content and data relating to the circumstances of the message, such as time/date of composition, time/date of communication, message recipient, a contact status of the message recipient, whether an attachment was included an address to which the message was sent (or from which it was received), and the like. Message content may include, but is not limited to, a subject line, a salutation used, a valediction used, the message body, the name by which the recipient was addressed, a signature used, and the like. The communication history module 230 may also determine whether the message content references a calendar item.

The communication history module 230 may monitor communications involving the message composer through various platforms including email, text messaging (e.g., SMS or MMS), instant messaging ("IM"), and social network communications. For example, communication history module 230 may access various applications on the messaging device 101 to obtain the communication history. In certain embodiments, the communication history module 230 may update a communication history database in response to detecting new communications involving the message composer. Identifying the communication history may include searching the communication history database for entries involving the message recipient. The communication history module 230 may include hardware circuitry and/or program code for execution on the processor 105.

In certain embodiments, the history module 225 and/or the communication history module 230 compiles a communication database containing the communication history. For example, the communication database may be organized based on message recipient and each entry may contain various items, including, but not limited to, an identity the message recipient, an address of the message recipient, a salutation used, a valediction used, a subject line used, a signature used. The database may further include the message body. In certain embodiments, the communication database may include other factors which may be used to select personal boilerplate including, but not limited to, a date and time of day the message was composed or communicated, an indication of whether attachments were included, a name used to address the message recipient, an indication of whether the message recipient was a contact of the message composer at the time the message was created, and the like.

The boilerplate history module 235, in one embodiment, is configured to identify the boilerplate history of the message composer. As used herein, boilerplate history refers to use of specific items of personal boilerplate in conversations involving the message composer. The boilerplate history may include specific text of the personal boilerplate, instances of use, frequency of use, and the like. In certain embodiments, the boilerplate history may also include data relating to circumstances of the use of the personal boilerplate, including, but not limited to, whether the personal boilerplate was used near a calendar item, whether the person boilerplate was used only with certain recipients, relationship types, relationship strengths, whether the personal boilerplate was used only in formal or professional settings, and the like. In certain embodiments, the boilerplate history module 235 may identify candidate personal boilerplate used by the message composer. The boilerplate history module 235 may include hardware circuitry and/or program code for execution on the processor 105.

In some embodiments, the boilerplate history module 235 monitors communications from the message composer through various platforms including email, text messaging, instant messaging, and social network communications. The boilerplate history module 235 may access various applications on messaging device 101 to obtain the boilerplate history. In certain embodiments, a boilerplate history module 235 may update a boilerplate database in response to detecting new personal boilerplate used. For example, a salutation may be considered as personal boilerplate once it is used a threshold number of times. Identifying the boilerplate history may include searching the boilerplate database.

In certain embodiments, the history module 225 and/or the boilerplate history module 235 may compile a boilerplate database containing boilerplate history. Each entry in the boilerplate database may contain various data including, but not limited to, the text of the personal boilerplate, a boilerplate type (e.g., salutation, valediction, subject line, signature, message body), a frequency of use for the personal boilerplate. In certain embodiments, entries in the boilerplate database may include other factors which may be used to select personal boilerplate including, but not limited to, an indication of whether the item of personal boilerplate correlates strongly with a particular time of day, date, event, holiday, appointment, or calendar item, an indication of whether the item of personal boilerplate correlates strongly with a particular message recipient, type of contact, relationship type, relationship strength, or other relationship information, an indication of whether the item of personal boilerplate correlates strongly with certain sentiment or message tone, an indication whether the item of personal boilerplate is for use in a formal or professional setting, and the like.

The boilerplate module 240, in one embodiment, is configured to populate the message being composed with personal boilerplate selected based on the communication history and the boilerplate history. The boilerplate module 240 selects specific items of personal boilerplate based on a plurality factors identified through the communication history in the boilerplate history. In certain embodiments, the boilerplate module 240 automatically adds the selected boilerplate to the message being composed. In other embodiments, the boilerplate module 240 suggests the selected boilerplate to the user and adds it to the message in response to user approval. In one embodiment, the boilerplate module 240 contains circuitry for populating the message being composed with personal boilerplate. In another embodiment, the boilerplate module 240 is implemented using program code executed on the processor 105.

In certain embodiments, the boilerplate module 240 receives candidate personal boilerplate from the boilerplate history module 235 and selects items of personal boilerplate that best match the circumstances of the message being composed. For example, the boilerplate module 240 may filter the candidate personal boilerplate for items whose usage match the time and/or date of the message being composed, the message recipient, the sentiment or message tone of the message being composed, and the like. Additionally, the boilerplate module 240 may consider upcoming holidays or calendar items and filter out candidate personal boilerplate that are relevant to the upcoming holidays or calendar items.

Here, the personal boilerplate is not static (e.g., predefined) but rather changes with the user's usage. For example, if the user changes jobs are received a promotion, they may sign their professional emails differently. This change in signature is reflected in the communication history and/or boilerplate history and the boilerplate module 240 will begin to populate messages with the new signature. As another example, a certain holidays approach, the user may include well wishes for the upcoming holiday in their communications. This inclusion of well-wishers will be reflected in the communication history and/or boilerplate history and the boilerplate module 240 will begin to populate messages with well wishes for the upcoming holiday.

The suggestion module 245, in one embodiment, suggests the selected personal boilerplate to the user. For example, the suggestion module 245 may display a particular salutation in a pop-up window, wherein the boilerplate module 240 adds the particular salutation to the message being composed in response to user approval or selection of the suggestion. As another example, the suggestion module 245 may display a suggested valediction within the message being composed in a visually distinct form, such as grayed-out or italicized text, wherein the boilerplate module 240 retains suggest valediction within the message being composed in response to user approval (e.g., the user pressing the enter key or another predefined key).

In certain embodiments, where the boilerplate module 240 has already added a particular item of personal boilerplate to the message being composed, the user may click or otherwise select the already added boilerplate. Here, the suggestion module 245 may offer one or more alternative items of personal boilerplate for selection by the user. If the user selects one of the alternative items of personal boilerplate, and the boilerplate module 240 may replace the already added item of personal boilerplate with the selected alternative items of personal boilerplate.

In some embodiments, the suggestion module 245 may access items of personal boilerplate from a network location and suggest these items of personal boilerplate to the user, even if such person boilerplate is not found within the boilerplate history. In one embodiment, the suggestion module 245 may offer suggestions from crowd-sourced boilerplate. For example, the suggestion module 245 may suggest particular personal boilerplate in response to news items, such as a major victory by a local or favorite sports team of the message composer. In another embodiment, the suggestion module 245 may offer suggestions from a subscribed third-party source.

In one embodiment, the suggestion module 245 contains circuitry for suggesting personal boilerplate to the user. In another embodiment, the suggestion module 245 is implemented using program code executed on the processor 105. While depicted as a component of the boilerplate module 240, in certain embodiments the suggestion module 245 may be a separate module within the messaging module 125.

The user selection module 250, in one embodiment, is configured to receive user input selecting personal boilerplate. In some embodiments, the user selection module 250 may monitor input received via an input device, such as the input device 115, responsive to the boilerplate module 240 automatically populating the message with personal boilerplate and/or the suggestion module 245 suggesting personal boilerplate. The user selection module 250 may then determine whether user input includes a selection of a particular item of personal boilerplate.

For example, after being presented with a list of suggested salutations, the user selection module 250 may receive a user selection of a salutation, the user selection defining the salutation to be inserted into the message being composed. In certain embodiments, the user selection module 250 may prompt for confirmation in response to the boilerplate module automatically inserting personal boilerplate into the message being composed. In one embodiment, the user selection module 250 contains circuitry for receiving user selection of personal boilerplate. In another embodiment, the user selection module 250 is implemented using program code executed on the processor 105. While depicted as a component of the boilerplate module 240, in certain embodiments the user selection module 250 may be a separate module within the messaging module 125.

The calendar module 255, in one embodiment, is configured to identify dates and/or events relevant to the selection of personal boilerplate. The calendar module 255 communicates the relevant dates and/or events to the boilerplate module 240, which then selects the personal boilerplate based in part on the relevant dates/events. In one embodiment, the calendar module 255 contains circuitry for identifying calendar items relevant to the personal boilerplate. In another embodiment, the calendar module 255 is implemented using program code executed on the processor 105.

In one embodiment, the calendar module 255 may access a calendar (or calendar application) belonging to the message composer to identify meetings, holidays, appointments, scheduled events, or other calendar items. The boilerplate module 240 may then select personal boilerplate based in part on the calendar items, such as a holiday-related salutation or valediction, a birthday greeting, or the like. As another example, the calendar module 255 may identify a day of the week. The boilerplate module 240 may then select personal boilerplate based on the day of the week, for example wishing the message recipient a pleasant weekend if the day of the week is near the end of the work week.

The time module 260, in one embodiment, is configured to identify a time, such as a time of day, when the message is being composed. The time module 260 may communicate the identified time to the boilerplate module 240, wherein the boilerplate module 240 selects the personal boilerplate based in part on the identified time. In some embodiments, the message composer and the message recipient may be located in different time zones. Here, the time module 260 may identify a local time for both the message composer and the message recipient. In one embodiment, the time module 260 determines whether the message is being composed during business hours (e.g., for either the message composer or the message recipient) and the boilerplate module 240 may select different personal boilerplate when the message is being composed during business hours that would not otherwise be selected.

For example, the boilerplate module 240 may select a formal salutation, valediction, and/or signature when the message is being composed during business hours and may select an informal salutation, valediction, and/or signature when the message is being composed outside of business hours. As another example, the message composer may use different names to address the message recipient during business hours then used outside of business hours. Here, the boilerplate module 240 may populate the personal boilerplate with an appropriate name for the message recipient based on the time of day.

In yet another example, the boilerplate module 240 may filter out salutations, valedictions, and other personal boilerplate that do not match the time of day. Here, the salutation "good morning" would be excluded when the time of day does not match morning hours for either the message composer or the message recipient. Conversely, if a user located in the New York City is composing an email at 9:00 PM Eastern Standard Time to a colleague located in Beijing, China, the boilerplate module may suggest the greeting "Good Morning" based on the time of day for the message recipient. In one embodiment, the time module 260 contains circuitry for identifying a time when the message is being composed. In another embodiment, the time module 260 is implemented using program code executed on the processor 105. While depicted as a component of the calendar module 255, in certain embodiments the time module 260 may be a separate module within the messaging module 125.

The content module 265, in one embodiment, is configured to identify contents of the message being composed. For example, the content module 265 may identify that the message includes an attachment. As another example, content module 265 may determine whether the message being composed contain certain keywords or uses jargon or slang. This information may be used to identify a message tone (e.g., formal vs. informal). Because certain personal boilerplate may be used only with short messages, the content module 265 may generate message statistics including a message length. The content module 265 may be implemented using hardware circuitry, program code to be executed on the processor 105, and combinations thereof.

In certain embodiments, the content module 265 includes a tone module 270 that identifies a message tone or sentiment of the message being composed. For example, the tone module 270 may distinguish between an informal conversation (e.g., between friends or family members) and a formal conversation (e.g., a business transaction) based on the language used in the message. Because different personal boilerplate is used for informal conversations than for formal conversations, the tone module 270 may communicate the identified message tone to the boilerplate module 240 to be considered when selecting the personal boilerplate.

Further, the tone module 270 may perform a sentiment or thematic analysis of the message content to identify a sentiment for the message. For example, the tone module 270 may categorize the message as "happy," "sad," "angry," "praising," "melancholy," or other emotion or category. Here, the boilerplate module 240 may select a valediction based on the message sentiment or theme. Further, the boilerplate module 240 may select certain emoji, emoticons, smileys, or other ideograms as personal boilerplate to include in the message being composed based on the message sentiment or theme. The tone module 270 may be implemented using hardware circuitry, program code to be executed on the processor 105, and combinations thereof. While depicted as a component of the content module 265, in certain embodiments the tone module 270 may be a separate module within the messaging module 125.

The composition module 275, in one embodiment, is configured to compose the message. In certain embodiments, the composition module 275 provides a user interface for composing the message. A user composes the message using the composition module 275. In certain embodiments, the boilerplate module 240 interacts with the composition module 275 to automatically populate a messaging being composed with personal boilerplate.

In one embodiment, the composition module 275 is a messaging client for providing messaging services via the messaging server 140. For example, the composition module 275 may be an email client, a SMS/MMS client application, a chat client, an IM client, and the like. In another embodiment, the composition module 275 is a web application which provides message management, composition, and reception functions. In certain embodiments, the composition module 275 provide messaging services over multiple messaging platforms. In other embodiments, different instances of the composition module 275 are used for messaging services over different messaging platforms. The composition module 275 may be implemented using hardware circuitry, program code to be executed on the processor 105, and combinations thereof.

FIGS. 3A-3C depict a messaging device 300 for populating an electronic message with personal boilerplate, according to embodiments of the disclosure. The messaging device 300, in one embodiment, identifies a message recipient for a message being composed at the messaging device 101, identifies a communication history between the message recipient and a message composer, identifies a boilerplate history of the message composer, and populates the message being composed with a salutation selected based on the communication history and the boilerplate history. In some embodiments, the messaging device 300 may be similar to the messaging device 101 and/or the messaging apparatus 200 described above with reference to FIGS. 1 and 2. Further, the messaging device 300 may include one instance of a messaging module 125 as described above with reference to FIGS. 1 and 2.

The messaging device 300, in one embodiment, includes a display 305 (e.g., a touchscreen display) that displays a messaging interface to the user, depicted here as an email client interface. The messaging interface may include several fields including an address ("to:") field 310, a subject line field 315, and a message body field 320. As depicted, the messaging interface also includes a virtual keyboard 325, however in other embodiments the messaging device 300 may omit the virtual keyboard 325. In some embodiments, the messaging device 300 may include one or more of a recipient module, a history module, a boilerplate module, a calendar module, the content module, and/or a composition module, as described above with reference to FIG. 2.

FIG. 3A depicts the messaging device 300 as the user begins to compose a message, according to embodiments of the disclosure. Here, the user has populated the address field 310, depicted as "Robert S. Baker." In certain embodiments, the address field 310 may indicate the address to which the message is addressed, here depicted as "president@acme.com." Where the messaging device 300 uses a messaging platform other than email, the address field 310 may include a phone number, an IM handle or username, or the like as suitable for the messaging platform.

FIG. 3B depicts the messaging device 300 identifying personal boilerplate for the message being composed, according to embodiments of the disclosure. Here, the messaging device 300 identifies candidate greetings (salutations) 330 for a message directed to "Robert S. Baker." The candidate greetings 330 are depicted as: "Hey Bob," "Robert," "Dear Mr. Baker," and "Dear Sir." It will be noted that these candidate greetings are illustrative in nature and other candidate greetings may be identified. Further, while four greetings are shown, any number of candidate greetings 330 may be identified by the messaging device 300. The candidate greetings 330 may be identified based on boilerplate history of the user. For example, analysis of the user's prior communications may show that the user tends to use the greeting "Dear . . . " in formal situations and greetings of "Hey" or just the recipient's name in informal situations.

Having identified the candidate greetings 330, the messaging device 300 selects a greeting based on communication history between the user (e.g., message composer) and the message recipient (Robert S. Baker). The communication history between the user and the message recipient may indicate a level of familiarity to be used, a preferred name of message recipient (e.g., Robert vs. Bob), and the like. The communication history may include examples of how the user has addressed the message recipient in the past.

The messaging device 300 may additionally select the greeting based on relationship between the user and the message recipient. For example, where the user and the message recipient are close associates, the messaging device 300 may select the greeting "Hey Bob" or "Robert." As another example, where the user and the message recipient are not close associates, the messaging device 300 may select the greeting "Dear Mr. Baker" or "Dear Sir." Additional factors that the messaging device 300 may consider when selecting the greeting include, but are not limited to, proximity to a holiday, event, weekend or calendar item, a time of day, the type of address for the message recipient (e.g., personal vs. professional address), a subject line of the message, and the like. Having selected a particular greeting, the messaging device 300 populates the message body with the selected greeting.

FIG. 3C also depicts the messaging device 300 identifying personal boilerplate for the message being composed, according to embodiments of the disclosure. Here, the messaging device 300 identifies candidate closings 335 (e.g., valedictions) for the message. The candidate closings 335 are depicted as: "Jon Lawson, Acme Widgets" and "Later, Jon." In the depicted embodiment, it is presumed that the user is Jon Lawson. Again, the candidate closings 335 are illustrative in nature and other candidate closings may be identified by the messaging device 300. Also, while two closings are shown, any number of candidate closings 335 may be identified by the messaging device 300. The messaging device 300 identifies the candidate closings 335 based on boilerplate history of the user.

Having identified the candidate closings 335, the messaging device 300 selects a closing based on communication history between the user and the message recipient. For example, the communication history may indicate that Jon Lawson prefers to include his name and position as a signature of all messages sent from his professional address. As another example, the communication history may indicate that Jon Lawson and Robert Baker have an amicable relationship and that Jon prefers the informal closing of "Later, Jon" with his friends, family, and other close relationships.

The messaging device 300 may additionally select a closing based on content of the message body (e.g., content within the message body field 320). For example, if the message body contains an invitation to lunch, then one closing may be more appropriate than another. Additional factors that the messaging device 300 may consider when selecting the greeting include, but are not limited to, proximity to a holiday, event, weekend or calendar item, a time of day, the type of address for the message recipient (e.g., personal vs. professional address), a subject line of the message, and the like. Having selected a particular closing, the messaging device 300 populates the message body with the selected closing.

Figure 4A:
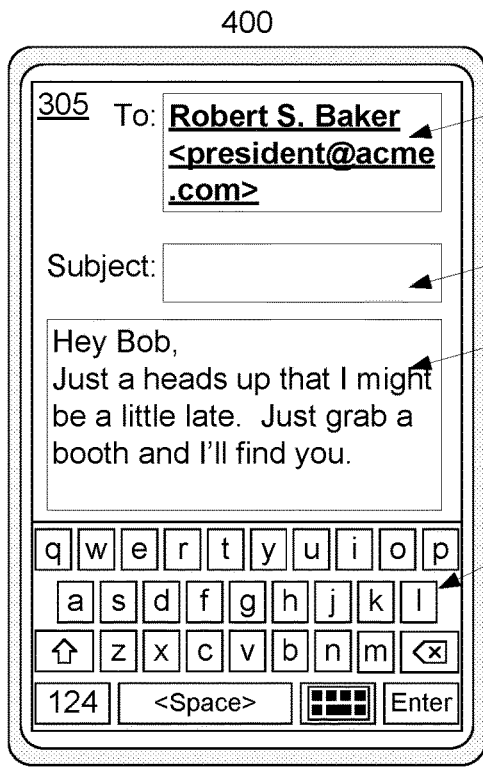
FIG. 4A is a diagram illustrating a second example of a messaging device populating an electronic message with personal boilerplate.
Figure 4B:
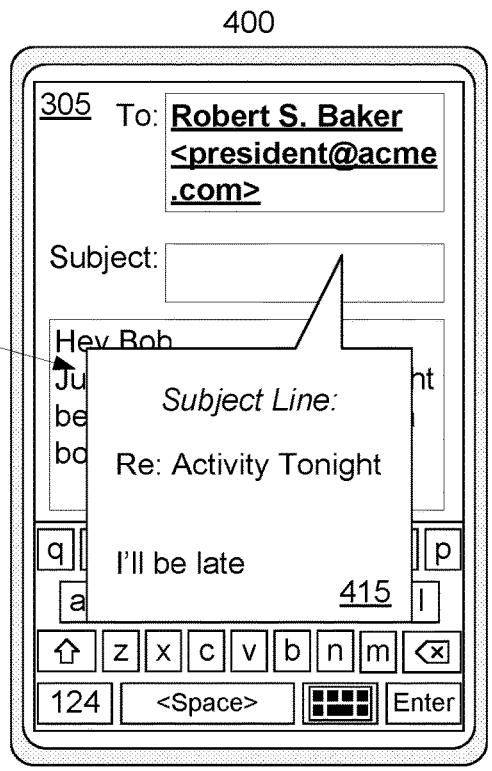
FIG. 4B is a diagram illustrating another embodiment of the messaging device of FIG. 4A.

FIGS. 4A-4B depict a messaging device 400 for populating an electronic message with personal boilerplate, according to embodiments of the disclosure. The messaging device 400 may be substantially similar to the messaging device 300 described above. Further, the messaging device 400 may include one instance of the messaging module 125 described above with reference to FIGS. 1 and 2. Here, the messaging device 400 includes a display 305 which provides a messaging interface for user, depicted here as an email client interface, and a virtual keyboard 325. Within the messaging interface is an address ("to:") field 310 indicating that "Robert S. Baker" with the email address "president@acme.com" is the message recipient and a subject line field 405.

Here, the messaging interface also includes a populated message body field 410 where the user has composed a message. In certain embodiments, portions of the message body may include personal boilerplate added by the messaging device 400. For example, the message body may contain a salutation, valediction, or other personal boilerplate content automatically added to the message based on the message recipient, communication history between the message recipient and the user (e.g., the message composer), and boilerplate preferred by the user.

FIG. 4B depicts the messaging device 400 identifying personal boilerplate for the message being composed, according to embodiments of the disclosure. Here, the messaging device 400 identifies candidate subject lines 415 for the message. The candidate subject line 415 are depicted as: "Re: Activity Tonight" and "I'll be late." It will be noted that these candidate subject lines 415 are illustrative in nature and other candidate subject lines may be identified based on boilerplate history of the user. Further, while two subject lines are shown, any number of candidate subject lines 415 may be identified by the messaging device 400.

Having identified the candidate subject lines 415, the messaging device 400 selects a subject line to be inserted in the subject line field 405 based on content of the populated message body field 410. Here, the populated message body field 410 indicated that the user may be late, therefore the messaging device 400 may select the subject line "I'll be late." The messaging device 400 may additionally select the subject line based on personal preferences indicated in the boilerplate history, the communication history, and the like. Having selected a particular subject line, the messaging device 400 populates the subject line field 405 with the selected subject line.

Figure 5A:
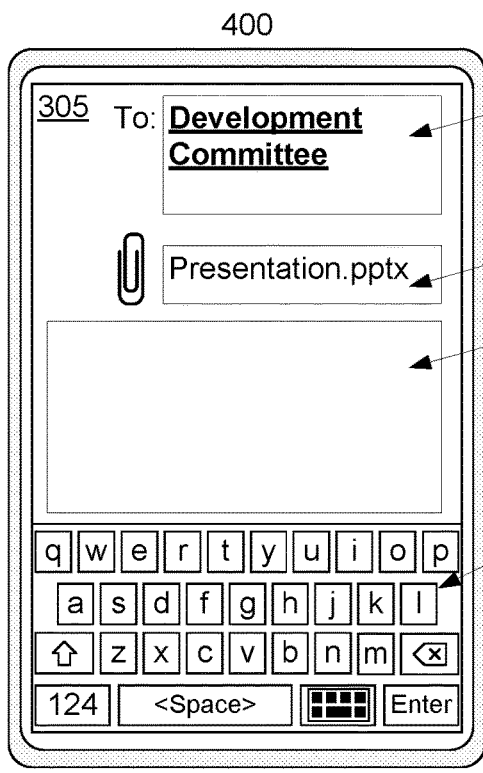
FIG. 5A is a diagram illustrating a third example of a messaging device populating an electronic message with personal boilerplate.
Figure 5B:
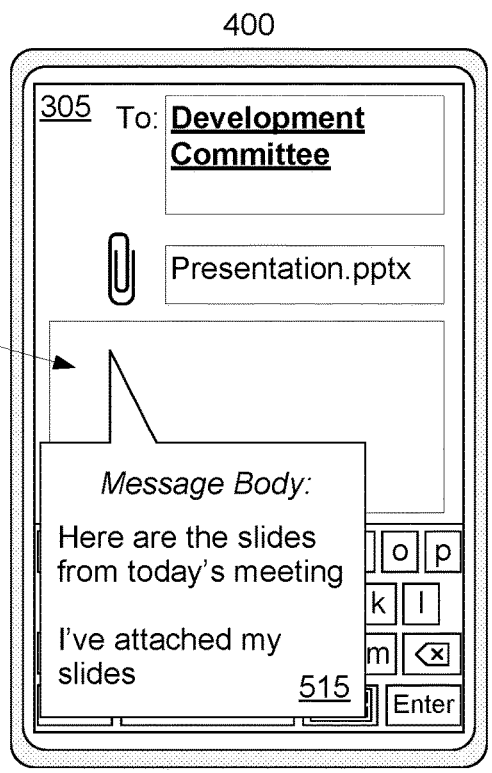
FIG. 5B is a diagram illustrating another embodiment of the messaging device of FIG. 5A.

FIGS. 5A-5B depict a messaging device 500 for populating an electronic message with personal boilerplate, according to embodiments of the disclosure. The messaging device 500 may be substantially similar to the messaging device 300 described above. Further, the messaging device 500 may include one instance of the messaging module 125 described above with reference to FIGS. 1 and 2. Here, the messaging device 500 includes a display 305 which provides a messaging interface for user, depicted here as an email client interface, and a virtual keyboard 325.

Within the messaging interface is an address ("to:") field 310 indicating the message recipient. In the depicted embodiment, the message is addressed to a group address, here the "Development Committee." The messaging device 500 may recognize the group address, for example by resolving the address into multiple addresses of individuals. Because the message is addressed to multiple recipients, the messaging device 500 may consider different personal boilerplate than for a single message recipient. Also within the messaging interface is an attachment field 505 and a message body field 510. Here, the user has included an attachment "presentation.pptx" to the message.

FIG. 5B depicts the messaging device 500 identifying personal boilerplate for the message being composed, according to embodiments of the disclosure. Here, the messaging device 500 identifies candidate message bodies 515 for the message. The candidate message bodies 515 are depicted as: "Here are the slides from today's meeting" and "I've attached my slides." The candidate message bodies 515 may be identified by determining that the message being composed includes an attachment and then examining prior messages to a group that included an attachment. It will be noted that the candidate message bodies 515 are illustrative in nature and other candidate message bodies may be identified based on boilerplate history of the user. Further, while two message bodies are shown, any number of candidate message bodies 515 may be identified by the messaging device 500.

Having identified the candidate message bodies 515, the messaging device 500 selects a message body to be inserted in the message body field 510, for example based on communication history between the user and the group, a relationship of the user to the group (e.g., whether the user is a member of the group), the proximity (in time) of the composed message to a calendar event (e.g., a meeting of the group), and the like. Having selected a particular subject line, the messaging device 500 populates the message body field 510 with the selected boilerplate.

Figure 6:
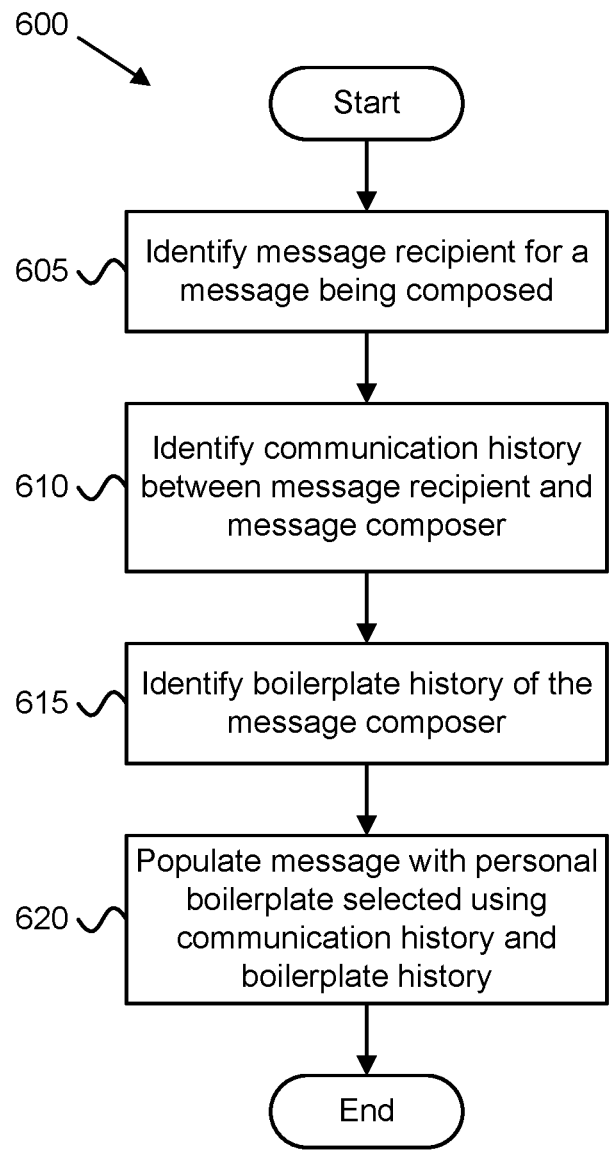
FIG. 6 is a schematic flow chart diagram illustrating another embodiment of a method for populating an electronic message with personal boilerplate.

FIG. 6 depicts a method 600 for populating an electronic message with personal boilerplate, according to embodiments of the disclosure. In some embodiments, the method 600 is performed using a messaging device, such as the messaging device 101, the messaging module 125, the messaging server 140, the correspondent node 150, the messaging apparatus 200, and/or the messaging devices 300, 400, 500, described above. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and identifies 605 a message recipient for a message being composed. In some embodiments, the message is being composed at the messaging device. In other embodiments, the message is being composed at a client of the messaging device. In some embodiments, identifying 605 the message recipient includes parsing one or more fields of a composition interface to identify the message recipient. For example, the composition interface may include a "to:" field, wherein contacts, addresses (e.g., email addresses), phone numbers, usernames, and the like may be input.

In some embodiments, the message being composed may be addressed to a plurality of recipients. For example, the message may be addressed to a group address or a group alias. As another example, the "to:" field may include multiple entries. In such embodiments, identifying 605 the message recipient includes identifying the plurality of recipients.

In certain embodiments, identifying 605 the message recipient includes accessing contact information and/or user profiles corresponding to each message recipient. In one embodiment, identifying 605 the message recipient includes determining whether the message is addressed to a personal address or a professional address of the message recipient.

Next, the method 600 includes identifying 610 communication history between the message recipient and the message composer. Where the message being composed is addressed to an individual address, identifying 610 communication history may include identifying communication between only the message composer and the message recipient (e.g., filtering out messages addressed to multiple recipients). In certain embodiments, the communication history may be drawn from multiple messaging platforms. For example, the communication history may include text (e.g., SMS or MMS) messages, emails, instant messaging ("IM") chats, and social network communications between the message recipient and the message composer. In some embodiments, identifying 610 communication history may include accessing a database containing previous communications between the message composer and the addressed individual.

Where the message being composed is addressed to multiple recipients, identifying 610 communication history may include identifying communications involving the message composer and addressed to multiple recipients. In certain embodiments, identifying 610 communication history may include identifying prior communication between only the message composer and the addressed multiple recipients. In other embodiments, identifying 610 communication history may include identifying prior communications between the message composer and groups or group aliases to which the message being composed is not addressed. For example, the messaging device may establish a baseline for communication from the message composer to groups or multiple recipients, generally, using prior communications to groups even if the current message is not addressed to the same groups.

In some embodiments, identifying 610 communication history may include identifying a frequency of communication and/or whether the message composer and the message recipient have previously communicated with one another. For example, the communication history may indicate whether the message recipient is a new contact, an infrequency contact, a frequent contact, or the like. Additionally, identifying 610 communication history may include identifying a relationship type between the message composer and the message recipient (e.g., personal, professional, familial, etc.).

The method 600 also includes identifying 615 boilerplate history of the message composer. In some embodiments, identifying 615 boilerplate history of the message composer involves examining prior messages composed by the message composer for common salutations, greetings, valedictions, signatures, subject lines, message bodies, and other personal boilerplate. In certain embodiments, identifying 615 boilerplate history of the message composer includes associating the personal boilerplate with message context, such as dates, times, attachments, and the like.

The method 600 further includes populating 620 the message being composed with personal boilerplate selected based on the communication history and the boilerplate history. For example, the messaging device may automatically insert the selected personal boilerplate into the message. As another example, the messaging device may prompt or suggest the user add the selected personal boilerplate to the message. The personal boilerplate may be selected from personal boilerplate identified in the boilerplate history that matches the message recipient and other message context. Additionally, populating 620 the message being composed with personal boilerplate may include customizing the personal boilerplate using one or more details obtained from the communication history. The method 600 ends.

Figure 7:
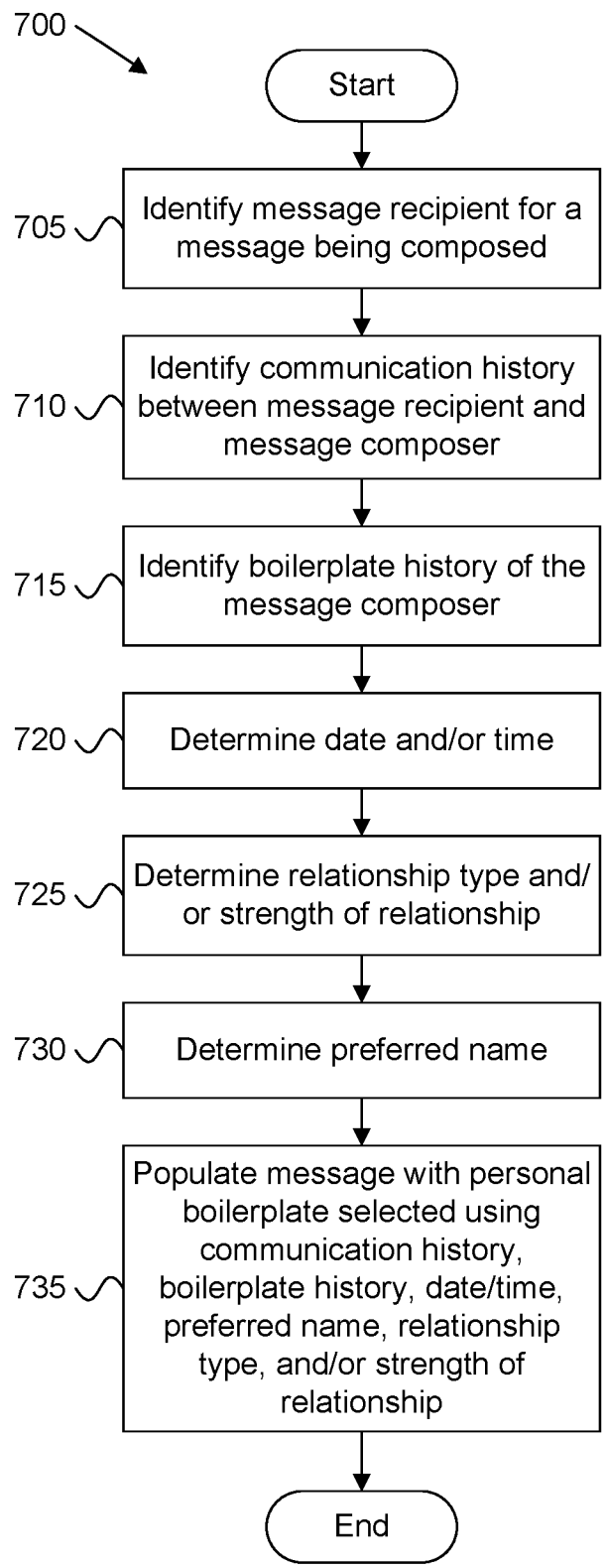
FIG. 7 is a schematic flow chart diagram illustrating another embodiment of a method for populating an electronic message with personal boilerplate

FIG. 7 depicts a method 700 for populating an electronic message with personal boilerplate, according to embodiments of the disclosure. In some embodiments, the method 700 is performed using a messaging device, such as the messaging device 101, the messaging module 125, the messaging apparatus 200, and/or the messaging devices 300, 400, 500, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and identifies the 705 a message recipient for a message being composed. In some embodiments, the message is being composed at the messaging device. In other embodiments, the message is being composed at a client of the messaging device. In some embodiments, identifying 705 the message recipient includes parsing one or more fields of a composition interface to identify the message recipient. For example, the composition interface may include a "to:" field, wherein contacts, addresses (e.g., email addresses), phone numbers, usernames, and the like may be input.

In some embodiments, the message being composed may be addressed to a plurality of recipients. For example, the message may be addressed to a group address or a group alias. As another example, the "to:" field may include multiple entries. In such embodiments, identifying 705 the message recipient includes identifying the plurality of recipients. In certain embodiments, identifying 705 the message recipient includes accessing contact information and/or user profiles corresponding to each message recipient. In one embodiment, identifying 705 the message recipient includes determining whether the message is addressed to a personal address or a professional address of the message recipient.

Next, the method 700 identifies 710 communication history between the message recipient and the message composer. Where the message being composed is addressed to an individual address, identifying 710 communication history may include identifying communication between only the message composer and the message recipient (e.g., filtering out messages addressed to multiple recipients). In certain embodiments, the communication history may be drawn from multiple messaging platforms. For example, the communication history may include text (e.g., SMS or MMS) messages, emails, instant messaging ("IM") chats, and social network communications between the message recipient and the message composer. In some embodiments, identifying 710 communication history may include accessing a database containing previous communications between the message composer and the addressed individual.

Where the message being composed is addressed to multiple recipients, identifying 710 communication history may include identifying communications involving the message composer and addressed to multiple recipients. In certain embodiments, identifying 710 communication history may include identifying prior communication between only the message composer and the addressed multiple recipients. In other embodiments, identifying 710 communication history may include identifying prior communications between the message composer and groups or group aliases to which the message being composed is not addressed. For example, the messaging device may establish a baseline for communication from the message composer to groups or multiple recipients, generally, using prior communications to groups even if the current message is not addressed to the same groups.

In some embodiments, identifying 710 communication history may include identifying a frequency of communication and/or whether the message composer and the message recipient have previously communicated with one another. For example, the communication history may indicate whether the message recipient is a new contact, an infrequency contact, a frequent contact, or the like. Additionally, identifying 710 communication history may include identifying a relationship type between the message composer and the message recipient (e.g., personal, professional, familial, etc.).

The method 700 identifies 715 boilerplate history of the message composer. In some embodiments, identifying 715 boilerplate history of the message composer involves examining prior messages composed by the message composer for common salutations, greetings, valedictions, signatures, subject lines, message bodies, and other personal boilerplate. In certain embodiments, identifying 715 boilerplate history of the message composer includes associating the personal boilerplate with message context, such as dates, times, attachments, and the like.

The method 700 determines 720 a date and/or a time during which the message is being composed. In certain embodiments, the time refers to a time for the message composer. In other embodiments, the time refers to a time for the message recipient, which may be different than the time for the message composer. Determining 720 the date may include determining whether the message is being composed during the business week or during the weekend. Determining 720 the time that may include determining whether the message is being composed during the morning, afternoon, evening, night time, and the like. In some embodiments, determining 720 the date and/or time may include determining a proximity (in time) to a holiday, meeting, appointment, scheduled event, or other calendar item.

The method 700 determines 725 a relationship type and/or a strength of relationship between the message recipient and the message composer. In certain embodiments, the identified relationship type may be a familial relationship, a commercial relationship, a friendship, an acquaintance, a workplace associate, a new contact, a membership in a common group, or the like. The strength of relationship may be indicated by a length of relationship, a frequency of communication between the message recipient and the message composer, a tone used in communications between the message recipient and the message composer, and the like.

The method 700 determines 730 a preferred name of the message recipient. In some embodiments, determining 730 the preferred name include searching the communication history to identify a preferred name of the message recipient based on the communication history. In certain embodiments, determining 730 the preferred name may include querying a server profile information of the message recipient indicating the preferred name. In some embodiments, determining 730 the preferred name is further based on membership in a common group.

The method 700 populates 735 the message being composed with personal boilerplate selected based on the communication history, boilerplate history, date/time, preferred name, relationship type, and/or strength of relationship. In one embodiment, populating 735 the message includes automatically inserting the selected personal boilerplate into the message. In another example, populating 735 the message includes prompting or suggesting the user add the selected personal boilerplate to the message.

The personal boilerplate may be selected from personal boilerplate identified in the boilerplate history that matches the message recipient and other message context, such as the date and/or time, the relationship type, and/or relationship strength. Additionally, populating 735 the message being composed with personal boilerplate may include customizing the personal boilerplate using the preferred name. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor to:
identify a message recipient for an electronic message being composed at the apparatus;
acquire personal boilerplate for a message composer;
identify a communication history between the message recipient and the message composer;
identify a boilerplate history of the message composer, the boilerplate history indicating context for use of specific items of the personal boilerplate;
identify a name preferred by the message recipient based on the communication history; and
populate the electronic message being composed with personal boilerplate selected based on the communication history and the boilerplate history, the selected personal boilerplate comprising at least a greeting and a valediction, wherein the selected personal boilerplate uses the preferred name; and
send the electronic message to the message recipient.

2. The apparatus of claim 1, wherein the selected personal boilerplate comprises one or more of a signature, a message body, and a subject line.

3. The apparatus of claim 1, wherein the processor further identifies a date and time of day, wherein the selected personal boilerplate is further selected based on the date and time of day.

4. The apparatus of claim 1, wherein identifying the message recipient comprises determining whether a recipient address is a professional address or a personal address, wherein different personal boilerplate is selected for the professional address than for the personal address.

5. The apparatus of claim 1, wherein the processor further identifies a relationship type between the message recipient and the message composer, the relationship type identified from the group consisting of: a familial relationship, a commercial relationship, a friendship, an acquaintance, a workplace associate, a new contact, and a membership in a common group, wherein the selected personal boilerplate is further selected based on the relationship type.

6. The apparatus of claim 5, wherein the processor further identifies a strength of relationship based on the communication history, wherein the selected personal boilerplate is further selected based on the strength of relationship.

7. The apparatus of claim 1, wherein the processor further selects one of a signature and a subject line based on the communication history and the boilerplate history.

8. The apparatus of claim 1, wherein the processor determines whether the electronic message includes an attachment and suggest certain items of personal boilerplate in response to the electronic message including an attachment.

9. A method comprising:
identifying a message recipient for an electronic message being composed at a messaging device;
acquiring personal boilerplate for a message composer;
identifying a communication history between the message recipient and the message composer;
identifying a boilerplate history of the message composer, the boilerplate history indicating context for use of specific items of the personal boilerplate;
identifying a name preferred by the message recipient based on the communication history; and populating, by use of a processor, the electronic message being composed with a personal boilerplate selected based on the communication history and the boilerplate history, the selected personal boilerplate comprising at least a greeting and a valediction, wherein the selected personal boilerplate uses the preferred name; and sending the electronic message to the message recipient.

10. The method of claim 9, further comprising identifying a date and time of day, wherein the selected personal boilerplate is further selected based on the date and time of day.

11. The method of claim 9, wherein identifying the message recipient comprises determining whether a recipient address is a professional address or a personal address, wherein different personal boilerplate is selected for the professional address than for the personal address.

12. The method of claim 9, further comprising identifying a relationship type between the message recipient and the message composer, the relationship type identified from the group consisting of: a familial relationship, a commercial relationship, a friendship, an acquaintance, a workplace associate, a new contact, and a membership in a common group, wherein the selected personal boilerplate is further selected based on the relationship type.

13. The method of claim 12, further comprising identifying a strength of relationship based on the communication history, wherein the selected personal boilerplate is further selected based on the strength of relationship.

14. The method of claim 9, further comprising performing a sentiment analysis, wherein the selected personal boilerplate is further selected based on the sentiment analysis.

15. The method of claim 9, further comprising identifying a message tone from content of the message being composed, wherein the selected personal boilerplate is further selected based on the message tone.

16. The method of claim 9, wherein the selected personal boilerplate further comprises one or more of a signature, and a message body, and a subject line.

17. A program product comprising a computer readable storage medium that stores code executable by a processor, the executable code comprising code to perform:

identifying a message recipient for an electronic message being composed at a messaging device;

acquiring personal boilerplate for a message composer;

identifying a communication history between As Amended message recipient and the message composer;

identifying a boilerplate history of the message composer, the boilerplate history indicating context for use of specific items of the personal boilerplate;

identifying a name preferred by the message recipient based on the communication history; and populating the electronic message being composed with personal boilerplate selected based on the communication history and the boilerplate history, the selected personal boilerplate comprising a greeting, wherein the selected personal uses the preferred name; and sending the electronic message to the message recipient.

18. The method of claim 9, further comprising:

determining whether the electronic message includes an attachment; and suggesting one or more items of personal boilerplate in response to the electronic message including an attachment.

19. The program product of claim 17, wherein identifying the communication history comprises determining whether the message recipient is a new contact or an existing contact, wherein different personal boilerplate is selected for a new contact than for an existing contact.

20. The program product of claim 17, further comprising code to perform a sentiment analysis on the message being composed and code to populate the message being composed with a one of a subject line and a valediction selected based on an identified message sentiment.

\* \* \* \* \*